April 28, 1925.
R. H. SMITH
PROCESS AND APPARATUS FOR THREADING NUTS
Filed July 14, 1921  2 Sheets-Sheet 1
1,535,184
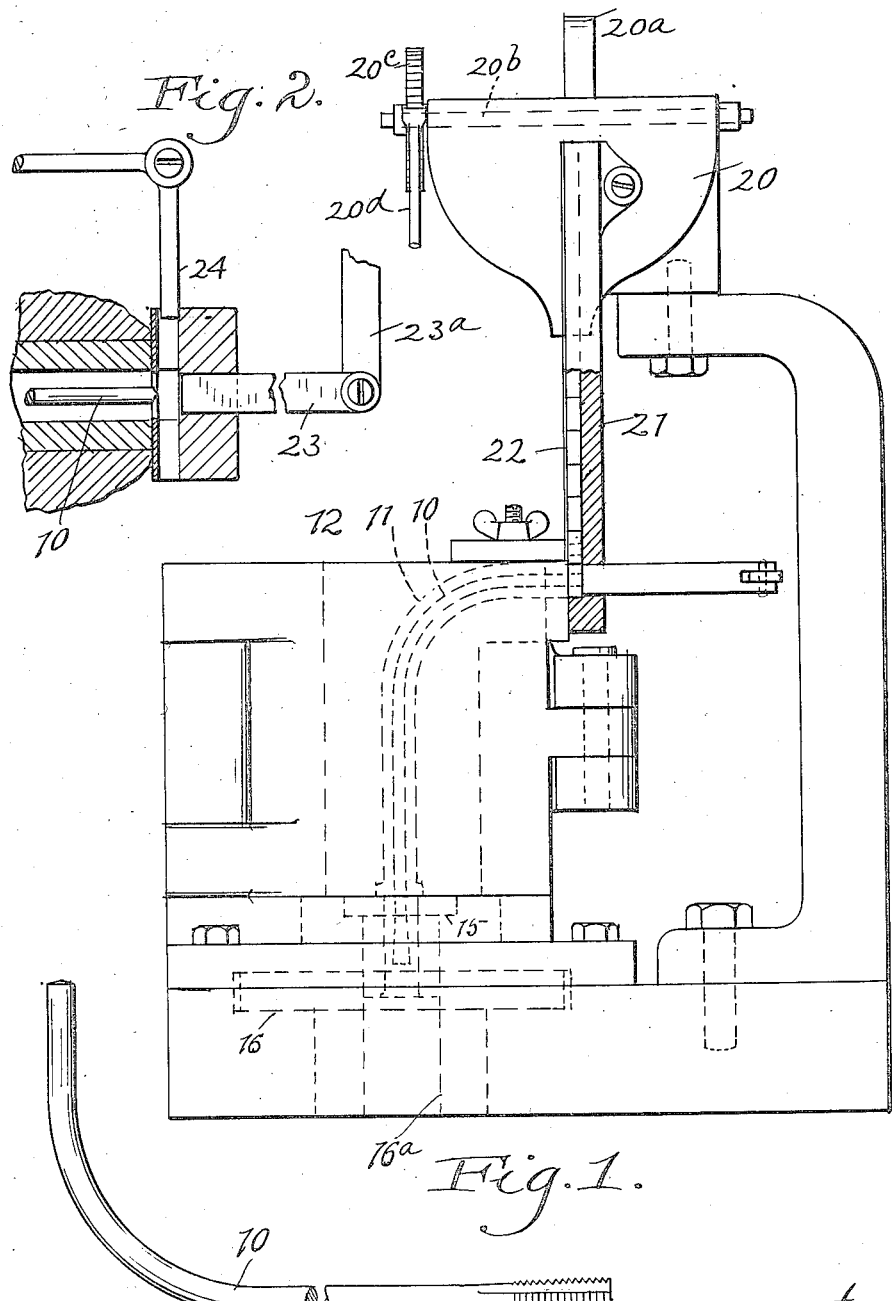
Fig. 2.
Fig. 1.
Fig. 5.
Inventor:
Roy H. Smith
by
Thurston Kwis & Hudson
attys.

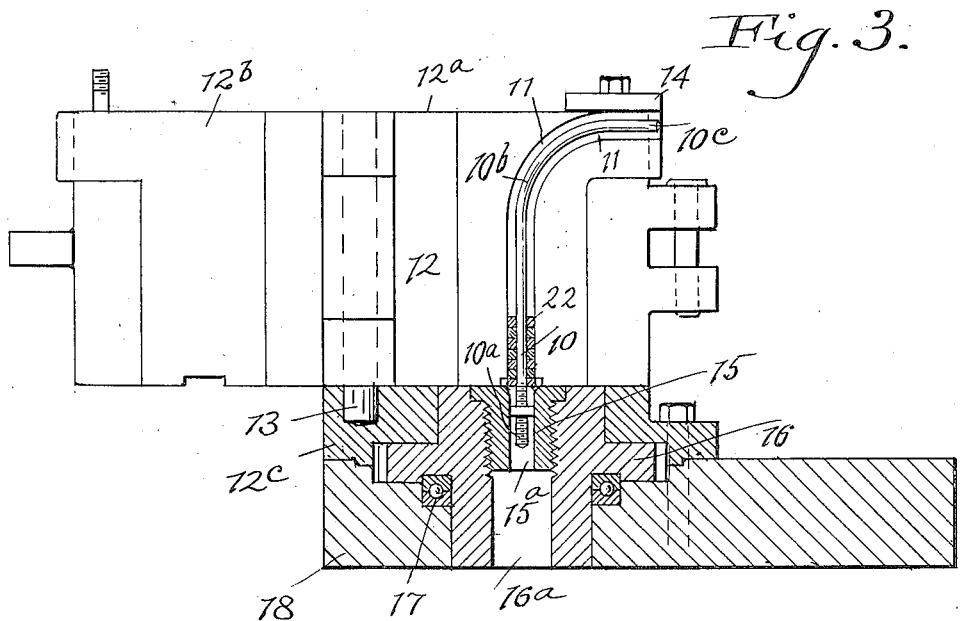
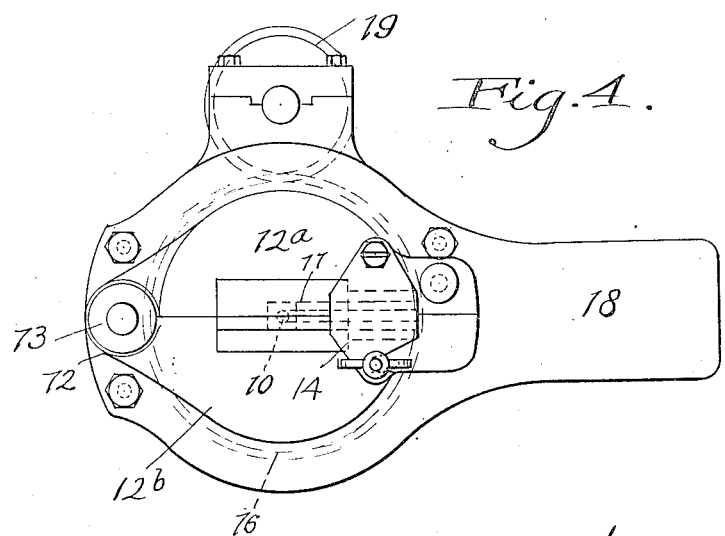

Patented Apr. 28, 1925.

1,535,184

UNITED STATES PATENT OFFICE.

ROY H. SMITH, OF KENT, OHIO.

PROCESS AND APPARATUS FOR THREADING NUTS.

Application filed July 14, 1921. Serial No. 484,571.

*To all whom it may concern:*

Be it known that I, ROY H. SMITH, a citizen of the United States, residing at Kent, in the county of Portage and State of Ohio, have invented a certain new and useful Improvement in Processes and Apparatus for Threading Nuts, of which the following is a full, clear, and exact description.

This invention relates to a process and apparatus for threading nuts, and has particular reference to the process heretofore extensively used, wherein a so-called bent or curved threading tool or tap has been used, and wherein the threading tool is supported and centralized in a passageway by the nuts.

The principal object of the invention is to improve the method of supporting the threading tool, and particularly to avoid the necessity of supporting the tool by the threaded nuts.

A still further object is to provide an arrangement wherein all operative movements of the articles operated on are in the direction of work accomplished, and preferably in a downward direction so that the chips wash in the direction of the threading operation, and not against it as in other processes, resulting in increased production and greater life of the threading tools.

The invention may be briefly summarized as consisting in certain novel steps of the improved method, and in certain features of construction and arrangement which will be described in the specification and set forth in the appended claims.

In the accompanying sheets of drawings wherein I have shown my invention somewhat conventionally, Fig. 1 is an elevation of a portion of a nut tapping machine to which my invention has been applied; Fig. 2 is a detail sectional view of the feeding and ejecting mechanism; Fig. 3 is a view partly in section and partly in elevation showing particularly the tool housing with the housing opened up; Fig. 4 is a plan view of the same with the housing closed; and Fig. 5 is a view on an enlarged scale showing a threading tool which may be employed.

It is one of the features of this invention that the threading tool be supported by the untapped blanks instead of the tapped nuts as heretofore, and to that end I employ a threading tool 10 with a threading portion 10$^a$ and a shank 10$^b$, with a bent or offset portion along which the nut blanks pass as they approach the threading end.

The bent shank may assume various shapes, the only essential characteristic being that it have a suitably bent or offset portion of a shape such that the blanks may pass along the same and at the same time hold the tool in threading position. It is sometimes the case that the tool has both end portions in alignment, and one or more bent or offset portions between its ends. It has been proposed also, to employ taps or threading tools whose end portions are out of alignment, but are parallel, and are connected by a curved offset portion. Likewise, taps of this general type have been employed wherein the shank was laterally curved so that one end (heretofore the discharge end) extended laterally out at about an angle of ninety degrees with reference to the straight portion. In this instance I have shown a threading tool of the shape last referred to, but it is to be understood that the tool may assume any of the shapes above referred to, or may have any other shape or contour such that the blanks to be threaded may pass freely along the tool and at the same time hold the tool in operating position.

Furthermore, as far as the broad features of my invention are concerned, it is immaterial whether the collet or equivalent device which receives the blanks during the threading operation, or the threading tool is rotated. In this instance the threading tool is stationary and the so-called collet is rotated, but the reverse arrangement may be employed.

It will be observed that the tap is received in a curved passageway 11 of a housing 12, the curvature of this passageway corresponding to the curvature of the threading tool 10, and, of course, the sides of the passageway being such that the blanks may pass along the passageway while surrounding the threading tool, so as to hold the latter in operative position in the housing. In this instance the housing 12 is composed of two hinged valves 12$^a$ and 12$^b$ (see Fig. 3, wherein the housing is opened) these halves being connected together by a hinge or pivot pin 13, and being designed to be locked or held in closed position by any suitable means such as a clamping or locking lever 14 shown in Fig. 4.

It will be observed that the threading end 10ª of the threading tool 10, and the straight portion thereof adjacent the threading end is vertically disposed, with the threading end at the lower end of the tool when in position in the curved passageway 11 of the housing. It will be observed also that the threading end 10ª of the tool extends into a vertically disposed collet 15 or equivalent device which receives and rotates the blanks as they are being threaded. The collet is secured centrally into a central passageway of a collet rotating gear 16, supported at the bottom of the housing 12, the gear being supported on an annular ball bearing 17, and in this instance being encased in the lower part 12ᶜ of the housing and a base member 18. This gear is rotated by a driving pinion 19 which can be driven in any suitable manner.

The collet 15 has a passageway 15ª and the hub of the gear 16 has a somewhat larger passageway 16ª for the passage of the nuts being tapped.

Ordinarily the blanks are fed onto the threading end 10ª of the threading tool and pass from the threading end onto the shank portion so that the tool is supported by the threaded nuts as heretofore stated. In accordance with the present invention the end of the tool here designated 10ᶜ opposite to the threading end 10ª receives the unthreaded blanks, and the latter pass down along the shank to the threading end, so that the tool is held in the curved passageway 11 by the unthreaded instead of the threaded blanks as heretofore.

Any suitable blank feeding mechanism may be utilized which answers the requirements, but in this instance I have shown a hopper 20 with which communicates a feed chute 21 having a slot along which the blanks herein designated 22 pass, the blanks being delivered from the hopper to the chute by any of the well-known means here represented by the feed wheel 20ª, supported on the shaft 20ᵇ designed to be turned through the medium of a ratchet wheel 20ᶜ and adapted to be intermittently operated by a pawl actuated by an arm 20ᵈ.

The bottom of the chute 21 is opposite the receiving end 10ᶜ of the threading tool 10, and at this point suitable means is provided to push or cause the blanks to pass onto the end of the threading tool. This means likewise may assume any suitable form, but in this instance I have shown a pusher 23, adapted to be moved back and forth at a suitable rate by actuating means indicated at 23ª.

Should the blanks be defective, as for example, if the hole is off-center, I propose that they be ejected, and to this end I have shown a reciprocating ejector 24 which operates in the passageway at right angles to the pusher 23, and pushes the blanks out from the lower part of the chute 21 in the event they do not pass onto the threading tool.

In operation the collet is rotated and the other parts are operated in predetermined timed relation, these parts including the mechanism for feeding the blanks to the chute 21, the pusher 23, and the ejector 24, which parts may be connected by simple means to any suitable part or parts of the driving mechanism of the machine. The blanks pass onto the receiving end of the threading tool, in this instance onto the end of the laterally bent or offset portion, and they pass in a downward direction down the shank of the tool, and while holding the threading tool in place await their turn to be spun over the threading end by the collet 15. In so doing they pass down through the passageway 15ª of the collet and pass to the machine through the vertical passageway 16ª as finished products, it being understood that the travel of the blanks is toward the threading, the general direction of travel being such that the chips will be carried also in a downward direction away from the threading tool. This, together with the fact that the more desirable method of supporting the threading tool by untapped blanks, results in increased efficiency, higher production and longer life for the threading tool.

The term "threading tool" is intended by me to include any sort of tool capable of performing the threading operation, the tool as herein shown being in the form of a tap, which cuts the threads, it being a characteristic of the invention that the relatively reduced or thread starting portion of the threading end is adjacent the shank, and the relatively large or finishing portion of the threading end is remote from the shank.

Having described my invention, I claim:

1. The method of threading nuts with a threading tool having an offset portion, which comprises feeding unthreaded blanks along the tool so as to support it, and then forming the threads with the threading tool.

2. The method of threading blanks with a threading tool having an offset portion which comprises feeding the unthreaded blanks along the offset portion before reaching the threading portion, and then along the threading portion to form the threads.

3. The method of threading nuts with a threading tool having an offset portion, which comprises feeding unthreaded blanks onto one end of a tool and causing them to pass along the offset portion and then onto the threading portion to form the threads, whereby the tool is supported by the unthreaded blanks.

4. The method of tapping nuts with a threading tool having an offset portion which comprises causing the blanks to pass from one end of the tool to the other from the offset portion to the threading portion and along the threading portion of the tool to form the threads, and to leave the tool immediately after being threaded.

5. The method of threading blanks with a threading tool having a shank with an offset portion, which comprises feeding the blanks in a general direction towards the threading portion, first along the shank of the tool and then along the threading portion to form the threads.

6. The method of threading nuts with a threading tool having a shank with an offset portion, which comprises feeding the blanks in a general desired direction along the shank of the tool and then along the threaded portion to form the threads, and guiding the blanks along the shank so as to support the tool.

7. A threading tool comprising a shank with an offset portion, and a threading portion having a reduced part toward the shank.

8. A tool for threading nut blanks having a shank with an offset portion, and having a threading portion whose finishing end is remote from the shank.

9. The method of tapping nuts with a threading tool which comprises feeding the unthreaded nuts along the shank of the tool to and along the threading portion thereof to form the threads and causing the unthreaded blanks to support the tool.

In testimony whereof, I hereunto affix my signature.

ROY H. SMITH.